(12) United States Patent
Chakraborty et al.

(10) Patent No.: US 11,399,553 B2
(45) Date of Patent: Aug. 2, 2022

(54) FLAVOR SYSTEM FOR NON-ANIMAL DERIVED PROTEIN CONTAINING CONSUMABLES

(71) Applicant: Givaudan SA, Vernier (CH)

(72) Inventors: Panchali Chakraborty, Mason, OH (US); Pablo Victor Krawec, Mason, OH (US); Hongyang Li, Mason, OH (US); Sudarshan Nadathur, Cincinnati, OH (US)

(73) Assignee: GIVAUDAN S.A., Vernier (CH)

( * ) Notice: Subject to any disclaimer, the term of this patent is extended or adjusted under 35 U.S.C. 154(b) by 978 days.

(21) Appl. No.: 14/843,409

(22) Filed: Sep. 2, 2015

(65) Prior Publication Data

US 2017/0055548 A1 Mar. 2, 2017

(51) Int. Cl.

| | |
|---|---|
| *A23L 2/56* | (2006.01) |
| *A23L 2/66* | (2006.01) |
| *A23L 27/00* | (2016.01) |
| *A23L 27/20* | (2016.01) |
| *A23C 9/13* | (2006.01) |
| *A23C 9/156* | (2006.01) |
| *A23L 29/30* | (2016.01) |
| *A23L 29/262* | (2016.01) |
| *A23L 29/256* | (2016.01) |
| *A23L 29/00* | (2016.01) |

(52) U.S. Cl.
CPC ............. *A23L 2/56* (2013.01); *A23C 9/1307* (2013.01); *A23C 9/156* (2013.01); *A23L 2/66* (2013.01); *A23L 27/20* (2016.08); *A23L 27/84* (2016.08); *A23L 29/30* (2016.08); *A23L 29/015* (2016.08); *A23L 29/256* (2016.08); *A23L 29/262* (2016.08)

(58) Field of Classification Search
CPC .......... A23L 27/10; A23L 27/11; A23L 27/12; A23L 27/13; A23L 27/20; A23L 27/36; A23L 27/84; A23L 2/56; A23L 2/66; A23L 2/60; A23L 33/17; A23L 29/30; A23L 29/015; A23L 29/256; A23L 29/262; A23C 9/123; A23C 9/1307; A23C 9/156; A23V 2002/00
USPC ......................................................... 426/583
See application file for complete search history.

(56) References Cited

U.S. PATENT DOCUMENTS

| | | |
|---|---|---|
| 8,158,180 B2 | 4/2012 | Reiss et al. |
| 8,394,442 B2 | 3/2013 | Reiss et al. |
| 2006/0257543 A1 | 11/2006 | Tachdjlan et al. |
| 2009/0155446 A1 | 6/2009 | Reiss et al. |
| 2012/0178828 A1 | 7/2012 | Reiss et al. |
| 2013/0136838 A1 | 5/2013 | Putter et al. |
| 2013/0136839 A1 | 5/2013 | Putter et al. |

FOREIGN PATENT DOCUMENTS

| | | | |
|---|---|---|---|
| EP | 2 559 346 A1 | 2/2013 | |
| GB | 751476 A * | 6/1956 | ............. A23L 27/10 |
| WO | WO 2006/084184 A2 | 8/2006 | |
| WO | WO 2008/119197 A1 | 10/2008 | |

OTHER PUBLICATIONS

PCT/EP2016/070623—International Search Report, dated Nov. 8, 2016.
PCT/EP2016/070623—International Written Opinion, dated Nov. 8, 2016.

* cited by examiner

*Primary Examiner* — Lien T Tran
*Assistant Examiner* — Tynesha L McClain
(74) *Attorney, Agent, or Firm* — Curatolo, Sidoti & Trillis Co., LPA; Salvatore A. Sidoti; Floyd Trillis, III

(57) ABSTRACT

A flavor system for a non-animal derived protein consumable is provided. The flavor system includes an aqueous component; a protein binder including a mixture of at least one terpene and at least one carbonyl compound; one or more off-note blocking compounds; and a flavorant.

9 Claims, No Drawings

FLAVOR SYSTEM FOR NON-ANIMAL DERIVED PROTEIN CONTAINING CONSUMABLES

FIELD OF THE INVENTION

The present disclosure relates to flavor systems for non-animal derived protein containing consumables. More particularly, the present disclosure relates to flavor systems having certain binders and off-note blocking compounds that improve the organoleptic properties of non-animal protein containing consumables.

BACKGROUND

The use of non-animal proteins in foodstuffs to replace animal raw materials such as egg or milk is becoming increasingly important due to the benefits of protein in the diet. While consumers expect their food and beverage products to have multi-functional benefits, consumers still have high expectations that those products deliver great taste along with efficacy in terms of health benefits. Because each type of protein has its own inherent taste, formulating protein into food and beverage products can produce distinctive tastes and textures perceived as unappealing. For example, products made from leguminous plants, such as soy or pea, display a flavor profile described as grassy, beany, green, earthy, nutty and/or bitter. Additionally, non-animal proteins also interact with flavor compounds and result in the reduction of flavor intensity, i.e. flavor fade. This reduction in flavor intensity occurs as the result of the absorption or binding of volatile flavor compounds to plant proteins in both solid state and in aqueous systems. Challenges remain with respect to non-animal protein containing consumables including, difficulties in a) selecting appropriate flavors; b) controlling the proper level of flavoring; and c) achieving the desired flavor intensity in a finished product.

Accordingly, there remains a need for non-animal protein ingredients and products containing non-animal proteins that exhibit improved flavor together with reduced off-notes.

SUMMARY

In one embodiment, a flavor system for a non-animal derived protein consumable includes an aqueous component; a protein binder including a mixture of at least one terpene and at least one carbonyl compound; one or more off-note blocking compounds; and a flavorant.

In another embodiment, a non-animal derived protein beverage composition includes a hydrated non-animal protein; an aqueous component; a protein binder including a mixture of at least one terpene and at least one carbonyl compound; one or more off-note blocking compounds; and a flavorant. The protein binder and off-note blocking compounds are present in concentrations sufficient to provide improved flavor release in the protein beverage compared to the same beverage without both the protein binder and off-note blocking compounds.

In yet another embodiment, a non-animal derived protein consumable includes a hydrated non-animal protein; a protein binder including a mixture of at least one terpene and at least one carbonyl compound; one or more off-note blocking compounds selected from the group consisting of fatty acids; carbonyls; sulfur; sweet browns; sweeteners; lactones and juice derivatives; and a flavorant. The weight ratio of off-note blocking compound to protein binder compound is between about 1:1 and about 5:1.

These and other features, aspects and advantages of specific embodiments will become evident to those skilled in the art from a reading of the present disclosure.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present disclosure relates to flavor systems for non-animal protein containing consumables and methods of producing such systems. Flavor systems according to the present disclosure include the combination of binders and off-note blocking compounds to increase flavor release, resulting in non-animal protein containing consumables having an improved flavor profile over time.

"Non-animal protein" refers to protein preparations made from raw materials including, but not limited to, grain (rice, millet, maize, barley, wheat, oat, sorghum, rye, teff, triticale, amaranth, buckwheat, quinoa); legume or pulses (soybean, sesame, mung beans, chickpeas, garbanzo, peas, fava beans, lentils, lima beans, lupins, peanuts, pigeon peas, runner beans, kidney beans, navy beans, pinto beans, azuki beans, cowpea, black-eyed peas); seed and oilseed (black mustard, India mustard, rapeseed, canola, safflower, sunflower seed, flax seed, hemp seed, poppy seed, pumpkin, chia, sesame); nut (almond, walnut, Brazil, Macadamia, cashews, chestnuts, hazelnuts, pine, pecans, pistachio and gingko); algal (kelp, wakame, spirulina, chlorella); mycoprotein or fungal protein; insects and leaf protein.

A. Flavor System

One of the most important criterion for consumer acceptance of foods is flavor. Proteins have little flavor of their own, but influence flavor perception via binding and/or adsorption of flavorants. Protein ingredients both transmit undesirable off-notes to foods and reduce perceived impact of desirable flavorants. In response, Applicants have developed a flavor system that makes it possible to provide non-animal protein ingredients and products containing non-animal proteins with an improved flavor profile with reduced off-notes.

According to the present disclosure, flavor systems may include, an aqueous component; a protein binder including a mixture of at least one terpene and at least one carbonyl compound; one or more off-note blocking compounds; and a flavorant. The flavor systems may also include other optional ingredients for particular applications. In one embodiment, a protein binder is selected based on its affinity to bind to non-animal proteins. According to the present disclosure, the flavor system will include binders having a higher affinity to non-animal proteins than the affinity of a flavorant to non-animal proteins. This results in a higher concentration of free flavorants (i.e. greater flavor release) in a particular consumable because the complex formed is binder/protein rather than flavorant/protein. This binder affinity is determined by a number of factors, including, for example, structure, composition, pH and ionic charges The flavor system of the present disclosure may be used in a wide variety of consumables or applications and is not restricted to any particular physical mode or product form. According to the present disclosure, the term "consumable" refers to products for consumption by a subject, typically via the oral cavity (although consumption may occur via non-oral means such as inhalation), for at least one of the purposes of enjoyment, nourishment, or health and wellness benefits. Consumables may be present in any form including, but not limited to, liquids, solids, semi-solids, tablets, capsules, lozenges, strips, powders, gels, gums, pastes, slurries, syrups, aerosols and sprays. The term also refers to, for example, dietary and nutritional supplements. Consumables include compositions that are placed within the oral cavity for a period of time before being discarded but not swallowed. It may be placed in the mouth before being consumed, or it may be held in the mouth for a period of time before being discarded.

Broadly, consumables include, but are not limited to, foodstuffs of all kinds, confectionery products, baked products, sweet products, savoury products, fermented products, dairy products, beverages, oral care products, nutraceuticals and pharmaceuticals.

Exemplary foodstuffs include, but are not limited to, chilled snacks, sweet and savoury snacks, fruit snacks, chips/crisps, extruded snacks, tortilla/corn chips, popcorn, pretzels, nuts, other sweet and savoury snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, meat analogues, frozen pizza, chilled pizza, soup, canned soup, dehydrated soup, instant soup, chilled soup, UHT soup, frozen soup, pasta, canned pasta, dried pasta, chilled/fresh pasta, noodles, plain noodles, instant noodles, cups/bowl instant noodles, pouch instant noodles, chilled noodles, snack noodles, dried food, dessert mixes, sauces, dressings and condiments, herbs and spices, spreads, jams and preserves, honey, chocolate spreads, nut-based spreads, and yeast-based spreads.

Exemplary confectionery products include, but are not limited to, chewing gum (which includes sugarized gum, sugar-free gum, functional gum and bubble gum), centerfill confections, chocolate and other chocolate confectionery, medicated confectionery, lozenges, tablets, pastilles, mints, standard mints, power mints, chewy candies, hard candies, boiled candies, breath and other oral care films or strips, candy canes, lollipops, gummies, jellies, fudge, caramel, hard and soft panned goods, toffee, taffy, liquorice, gelatin candies, gum drops, jelly beans, nougats, fondants, combinations of one or more of the above, and edible flavour compositions incorporating one or more of the above.

Exemplary baked products include, but are not limited to, alfajores, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savoury biscuits and crackers, bread substitutes.

Exemplary sweet products include, but are not limited to, breakfast cereals, ready-to-eat ("rte") cereals, family breakfast cereals, flakes, muesli, other ready to eat cereals, children's breakfast cereals, hot cereals.

Exemplary savoury products include, but are not limited to, salty snacks (potato chips, crisps, nuts, tortilla-tostada, pretzels, cheese snacks, corn snacks, potato-snacks, ready-to-eat popcorn, microwaveable popcorn, pork rinds, nuts, crackers, cracker snacks, breakfast cereals, meats, aspic, cured meats (ham, bacon), luncheon/breakfast meats (hotdogs, cold cuts, sausage), tomato products, margarine, peanut butter, soup (clear, canned, cream, instant, ultrahigh temperature "UHT"), canned vegetables, pasta sauces.

Exemplary dairy products include, but are not limited to, cheese, cheese sauces, cheese-based products, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavoured, functional and other condensed milk, flavoured milk drinks, dairy only flavoured milk drinks, flavoured milk drinks with fruit juice, soy milk, sour milk drinks, fermented dairy drinks, coffee whiteners, powder milk, flavoured powder milk drinks, cream, yoghurt, plain/natural yoghurt, flavoured yoghurt, fruited yoghurt, probiotic yoghurt, drinking yoghurt, regular drinking yoghurt, probiotic drinking yoghurt, chilled and shelf-stable desserts, dairy-based desserts, soy-based desserts.

Exemplary beverages include, but are not limited to, flavoured water, soft drinks, fruit drinks, coffee-based drinks, tea-based drinks, juice-based drinks (includes fruit and vegetable), milk-based drinks, gel drinks, carbonated or non-carbonated drinks, powdered drinks, alcoholic or non-alcoholic drinks, and ready to drink liquid formulations of these beverages.

Exemplary fermented foods include, but are not limited to, cheese and cheese products, meat and meat products, soy and soy products, fish and fish products, grain and grain products, fruit and fruit products.

In certain embodiments, a beverage composition is provided which includes a high concentration of non-animal derived protein. The total amount of protein may be between about 2% by weight and about 15% by weight, or between about 2% and about 12% by weight, or between about 3% and about 10% by weight, or between about 4% and about 8% by weight, between about 5% and about 7% by weight, or between about 6.4% to 6.5%, or about 6.4% protein by weight, or greater than 3% by weight, greater than 4% by weight, greater than 5% by weight, or greater than 6% by weight of the high protein beverage composition, or any percentage ranges or specific percentages within these ranges.

Without being limited by theory, it is believed that the flavor system according to the present disclosure provides improved flavor to consumables containing non-animal proteins by using a binder to bind to and form a complex with the non-animal protein and one or more off-note blocking compounds to mask or block undesirable off-notes. It is believed that such a system results in an increased flavor release, i.e. flavorants that are not bound to or absorbed onto a protein. These free flavorants lead to improved aroma and taste perception and thus an improved flavor profile for consumables containing non-animal proteins.

As illustrated below, one way to evaluate the function and effectiveness of the flavor system is to calculate flavor release or free flavorants present in a non-animal protein containing consumable. Utilizing a solid-phase microextraction (SPME) test described herein, a Flavor Release Factor can be determined to compare the free flavorants in head space in non-animal protein consumables with and without the flavor system according to the present disclosure. A Flavor Release Factor may be calculated for any combination of non-animal containing protein and flavor. For purposes of illustration, the discussion below will focus on a soy protein combined with a vanilla flavor.

First, at least five key chemical ingredients of a flavor are identified. In one embodiment, for example, vanilla, eight key ingredients were identified and include: ethyl butyrate; gamma-valerolactone; gamma-octalactone; heliotropine; gamma-nonalactone; vanillin; gamma-decalactone and delta-decalactone. For each key ingredient, a flavor threshold was determined. The taste threshold is the lowest concentration of a certain flavor compound that is perceivable by the human sense of taste or smell. The taste threshold of a chemical compound is determined in part by its shape, polarity, partial charges and molecular mass. Threshold values for common flavor compounds may be found in "Flavor Thresholds—Compilations of Flavor Threshold Values in Water and Other Media", L. J. van Gernert, Oliemans Punter & Partners BV, The Netherlands, 2011.

Next, a peak area marker was calculated using SPME for each key ingredient for two different samples. The first sample (Sample A) includes soy protein (ADM-Profarm 781) combined with a protein binder/off-note masking compound/vanilla flavor. The second sample (Sample B) includes the soy protein and vanilla flavor but does not include the protein binder and off-note masking compound. Based upon these results, a Total Flavor Release Factor can be determined by the following equation:

$$\text{Total Flavor Release Factor} = \frac{\frac{\Sigma(\text{peak area for each key flavor ingredient}/\text{threshold for each key flavor ingredient})}{(\text{Protein with binder}/\text{masking compound}/\text{flavor})}}{\frac{\Sigma(\text{peak area for each key flavor ingredient}/\text{threshold for each key flavor ingredient})}{(\text{Protein with flavor and without binder}/\text{masking compound})}} \times 100$$

TABLE 1

Soy Protein Beverage

| Vanilla Key Ingredients | Sample A[1] | | Sample B[2] | |
|---|---|---|---|---|
| | Peak Area (×10$^6$) | Threshold (ppm) | Peak Area (×10$^6$) | Threshold (ppm) |
| ethyl butyrate | 239.1 | 0.45 | 246.8 | 0.45 |
| gamma-valerolactone | 2.08 | 100 | 3.32 | 100 |
| gamma-octalactone | 6.49 | 0.4 | 7.6 | 0.4 |
| heliotropine | 71.2 | 1.0 | 66.7 | 1.0 |
| gamma-nonalactone | 2.89 | 0.065 | 3.6 | 0.065 |
| vanillin | 683.7 | 0.2 | 164.5 | 0.2 |
| gamma-decalactone | 2.32 | 0.09 | 3.14 | 0.09 |
| delta-decalactone | 4.62 | 0.14 | 4.65 | 0.14 |

[1]Soy protein with binder/masking compound/flavor
[2]Soy protein with flavor and without binder/masking compound Using the above formula and the results from Table 1, the Flavor Release Factors for Sample A and Sample B were calculated.

Flavor Release Factor (Sample A)=4140
Flavor Release Factor (Sample B)=1580

As shown, the sample according to the present disclosure (Sample A) has a higher Flavor Release Factor compared to Sample B.

For the soy protein beverage, the total Flavor Release Factor=(4140/1580)×100=260%

1. Aqueous Component

In one embodiment, a flavor system accordance with the present disclosure may comprise an aqueous component in one example, water is a basic solvent of the aqueous component, typically being the vehicle or primary liquid portion in which the remaining ingredients are dissolved, emulsified, suspended or dispersed.

Purified water can be used in the manufacture of certain embodiments of the flavor system, and water of a standard beverage quality can be employed in order not to adversely affect taste, odor, or appearance. The water typically will be clear, colorless, free from objectionable minerals, tastes and odors, free from organic matter, low in alkalinity and of acceptable microbiological quality based on industry and government standards applicable at the time of production.

Other exemplary solvents include, but are not limited to, glycerol, arabitol erythritol, HSH, isomalt, lactitol, maltitol, mannitol, sorbitol, xylitol, vegetable oils, propylene glycol, ethanol and triacetin. In certain embodiments, the aqueous component is present at a level of from about 90% to about 99.9% by weight of the flavor system.

2. Protein Binder

In one embodiment, a binder is selected based upon its ability to tie up or bind to the protein thus preventing the protein from binding to the flavorant. This ability to bind to the protein and "free-up" the flavorant is determined by a number of factors, including, for example, amino acid profile, protein confirmation, hydrophobicity, time of addition, behavior of protein during processing, type of characterizing flavorant(s) and polarity of flavorant(s).

In accordance with one embodiment, the protein binder according to the present disclosure may include a mixture of at least one terpene and at least one carbonyl compound. In another embodiment, the protein binder may include a mixture of a terpene and two or more carbonyl compounds.

In one embodiment, suitable terpenes (isoprenoids and tetraterpenoids) include, but are not limited to, carotenes (such as, for example, alpha-carotene, beta-carotene, gamma-carotene, delta-carotene, lycopene, neurosporene, phytofluene, phytoene), and xanthophylls (such as, for example, canthaxanthin, cryptoxanthin, acaxanthin, astaxanthin, lutein, rubixanthin); monoterpenes (such as, for example, limonene, perillyl alcohol); sesquiterpenes (such as, for example, caryophyllene, β-caryophyllene, zingiberene); saponins; lipids including: phytosterols, campesterol, beta sitosterol, gamma sitosterol, stigmasterol, tocopherols (vitamin E), and omega-3, -6, and -9 fatty acids (such as, for example, gamma-linolenic acid); triterpenoids (such as, for example, oleanolic acid, ursolic acid, betulinic acid, moronic acid); alpha-pinenes, cis-beta-ocimenes and bisabolenes (such as alpha-bisabolene and gamma-bisabolene.

Suitable carbonyl compounds include ketones and aldehydes, including, but are not limited to, acetone, acetyl methyl carbinol, acetophenone, 2-butanone, L-carvone, D-carvone, diacetyl, 2-heptanone, beta-ionone, L-menthone, anisyl acetaone, methyl cyclopentenolone, methyl nonyl ketone, methyl heptenone, 2-nonanone, 2-octanone, 2-pentanone, 2-undecanonen, 4-hydroxy-2,5dimethyl-3(2H)-furanone, nootkatone, tridecanone, tetradecalactone, decalactone, butyrolactone, 2-tridecanone, benzaldehyde, n-butyraldehyde, isobutraldehyde, cinnamic aldehyde, citronellal, decanal, docecenal, hexanal, aldehyde C-12, aldehyde C-8, acetaldehyde, trans-2-hexenal, anisyl aldehyde, trans 2-decenal, cis-3-hexenal and cis-4-heptenal.

The flavor system may include the protein binder in an amount from about 0.05% to about 1%, in another embodiment from about 0.05% to about 0.6%, in yet another embodiment from about 0.1% to about 0.3%, or any individual number within the range, by weight of the non-animal protein.

3. Off-Note Blocking Compounds

An off-note blocking compound is selected based on its ability to block, mask or modify the undesirable off-note(s) in a particular non-animal derived protein. Masking or blocking undesirable flavor notes has been practiced in food and beverage development for many years. Historically, this involved using more sugar or fat to cover bitterness and adjust flavor perception. Flavorists simply "over flavored" their products to hide the offending taste. These traditional methods are wholly unsatisfactory, especially for health conscious consumers where reduced fat and sugar content is a common goal.

Various non-animal proteins provide undesirable off-notes. Particularly, undesirable off-notes are the beany, bitter, grassy, astringent, earthy, chalky, and rancid off-notes. The term off-note refers to an unpleasant after taste that develops over time after consumption of consumables. The addition of off-note blockers will block, mask or modify the off-notes and make them less apparent or unnoticeable. Non-animal proteins will thereby lose their beany/bitter grassy/astringent/earthy/chalky/rancid taste.

The off-note blockers can be added to consumables to block the undesirable off-notes of non-animal proteins present in said consumables or added to such consumables. Flavor compositions for addition to consumables can be formed that provide the off-note blockers and an off-note providing ingredient for addition to consumables, and optionally food grade excipients. Alternatively, the off note blockers can be directly added to consumables.

For example, in soy products, the off-note blocker may be added to suppress the bitterness and hearty off-notes associated with peptides, isoflavones such as genistein and daidzein present in said products. In HVP (hydrolysed vegetable protein) products, the off-note blocker may be added to suppress the bitterness associated with bitter peptides present in said products.

According to one embodiment, suitable off-note blocking compounds for use in accordance with the present disclosure include fatty acids including, but not limited to, nonanoic acid, decanoic acid, dodecanoic acid, tetradecanoic acid, hexadecanoic acid, oleic acid, octanoic acid, 9-decenoic and hexanoic.

In another embodiment, suitable off-note blocking compounds include carbonyls including, but not limited to, acetoin, acetyl propionyl, 2-heptanone, 2-nonanone, 2-undecanone and cis-4-heptenal. In another embodiment, suitable off-note blocking compounds include sulfur, including, but not limited to, dimethyl sulfide, dimethyl trisulfide and extracts of alliaceous ingredients.

In another embodiment, suitable off-note blocking compounds include sweet browns including, but not limited to, maltol, vanillin, cyclopentenolone, furaneol, vanilla extracts, vanilla derivatives, caramel extracts and condensed milk derivatives.

In another embodiment, suitable off-note blocking compounds include esters including, but not limited to, ethyl caprate, ethyl dodecanoate, ethyl myristate, ethyl palmitate and ethyl oleate. In another embodiment, suitable off-note blocking compounds include sweeteners including but not limited to, steviol glycosides such as rebaudiosides; rebusodide, swingle extract, mogroside V, erythritol, glucosylated steviol glycosides, honey distillates and sugar distillates.

In another embodiment, suitable off-note blocking compounds include lactones including, but not limited to, gamma decalactone, delta decalactone, delta dodecalactone, gamma undecalactone and massoia lactone. In another embodiment, off-note blocking compounds include juice derivatives including, but not limited to, strawberry, cucumber, apple, cherry, kiwi and apricot.

The flavor system may include the off-note blocking compound in an amount from about 0.00000001% to about 0,0025%, in another embodiment from about 0.0000001% to about 0.0015%, in another embodiment from about 0.000001% to about 0.001%, in yet another embodiment from about 0.00001% to about 0.0005%, or any individual number within the range, by weight of consumable.

In accordance with another embodiment, the flavor system includes a plurality of off-note blocking compounds, including, for example, 5, 6, 7, 8, 9, 10, 11, 12, 13, 14, 15, 16, 17, 18, 19, 20, 21, 22, 23, 24, 25, 26, 27, 28, 29, 30 or more off-note blocking compounds. In some embodiments, the flavor system includes at least five off-note blocking compounds; in another embodiment at least ten off-note blocking compounds; in another embodiment at least fifteen off-note blocking compounds; in another embodiment at least twenty off-note blocking compounds; in another embodiment at least twenty-five off-note blocking compounds; and in yet another embodiment at least thirty off-note blocking compounds.

The flavor system may include the off-note blocking compound and protein binder in weight ratio between about 1:1 and about 20:1, in another embodiment between about 1:1 and about 10:1; and in yet another embodiment between about 1:1 and about 5:1.

4. Flavorants

By "flavorant" it is meant a composition created by a flavorist using methods known to the skilled person that is a mixture of tastants, aroma compounds and sensates. Examples of suitable flavorants include natural flavors, artificial flavors, spices, seasonings, and the like. Exemplary flavorants include synthetic flavor oils and flavoring aromatics and/or oleoresins, essences, and distillates, and a combination comprising at least one of the foregoing.

Flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors such as vanilla, and citrus oils including lemon, orange, lime, grapefruit, yuzu, sudachi, and fruit essences including apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, papaya, and so forth.

Additional exemplary flavors imparted by a flavorant include a milk flavor, a butter flavor, a cheese flavor, a cream flavor, and a yogurt flavor, a vanilla flavor, tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; floral flavors; and vegetable flavors, such as an onion flavor, a garlic flavor, a cabbage flavor, a carrot flavor, a celery flavor, mushroom flavor, and a tomato flavor.

According to some embodiments, flavorants may also include aldehydes and esters such as cinnamyl acetate, cinnamaldehyde, citral diethylacetal, dihydrocarvyl acetate, eugenyl 49 formate, p-methylamisol, and so forth can be used. Further examples of aldehyde flavourings include acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavours), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), and the like.

Generally any flavorant or food additive such as those described in "Chemicals Used in Food Processing", Publication No 1274, pages 63-258, by the National Academy of Sciences, can be used. This publication is incorporated herein by reference.

The flavor system may include from about 0.01% to about 1.0%, in another embodiment from about 0.1% to about 0.7%, in yet another embodiment from about 0.2% to about 0.5%, or any individual number within the range, by weight of the final product composition of a flavorant.

5. Optional Ingredients

The flavor systems and compositions may, optionally, include additional ingredients which include, but are not limited to, stabilizers, emulsifiers, preservatives, gums, starches, dextrins, vitamins and minerals, functional ingredients, salts, antioxidants, sweeteners, and polyunsaturated fatty acids.

In one embodiment, stabilizers enhance physical properties of plant protein containing consumables by imparting viscosity or mouthfeel properties that may increase consumer appeal. Stabilizers may be natural or artificial and may contribute to a uniform appearance of products by stabilizing and or suspending insoluble materials and preventing separation or settling of ingredients. Examples of stabilizers may include, but are not limited to, emulsifiers, starches, gums, and various hydrocolloids such as guar, acacia, locust bean, xanthan, gellan, carrageenan, cellulose, and pectin. Approximate ranges of stabilizers may vary from 0.02 to 5% depending on desired product properties and functionality of stabilizers.

In another embodiment, vitamins and minerals may be added to fortify plant protein containing consumables. As an example, in some embodiments, the product may be fortified with calcium using calcium sources such as carbonate ($CaCO_3$) and/or tricalcium phosphate ($Ca_3(PO_4)_2$). The calcium source may be selected to maintain a pH level within a suitable range during processing.

In another embodiment, functional ingredients like fiber, plant sterols, etc. may be added to plant protein containing consumables to enhance functionality of products. In another embodiment, salts of various types may also be used to improve taste, and to act as buffering agents to enhance protein stability. Such salts include sodium citrate, sodium chloride, potassium citrate, potassium phosphate, and dipotassium phosphate.

In another embodiment, antioxidants may prevent and/or reduce oxidation and may preserve the flavorant and appearance of the product during refrigerated and/or unrefrigerated storage. Antioxidants may reduce oxidation by trapping free radicals in the product.

In another embodiment, sweeteners may be natural, artificial, and/or high-intensity and may function to make the products taste more appealing, Depending on their sweetening power, sweeteners may comprise approximately 0.1% to 20% of the flavor system or composition. Natural, high-intensity sweeteners, such as stevia or stevia derivatives, may be used as a low-calorie alternative to or in combination with other sweeteners, such as other natural, high-intensity sweeteners, sugar (e.g., liquid sugar, crystallized sugar, honey, agave, cane juice, etc.), and/or artificial sweeteners (e.g., sucralose, aspartame, saccharine, etc.). In some embodiments, an amount of sugar to be combined with the natural, high-intensity sweetener may be selected to yield a selected sweetness level and selected number of calories, while minimizing metallic or bitter flavors that may be associated with the natural, high-intensity sweetener alone.

In another embodiment, polyunsaturated fatty acids (PUFAs) refer to a family of fatty acids that naturally occur in certain fish, leafy green vegetables, and vegetable oils. Examples of polyunsaturated fatty acids include omega fatty acids, such as omega-3 fatty acids (e.g., docosahexaenoic acid (DHA), docosapentaenoic acid (n-3) (DPAn-3), stearidonic acid (SDA), linolenic acid (LNA), and alpha linoleic acid (ALA), and eicosapentaenoic acid (EPA)), and omega-6 fatty acids (e.g., arachidonic acid (ARA), docosapentaenoic acid (n-6) (DPAn-6), linoleic acid (LA), gamma linolenic acid (GLA), and dihomo gamma linolenic acid (n-6)).

The present disclosure further relates to a method for making a flavor system for a plant protein containing consumable.

EXAMPLES

The following examples are given solely for the purpose of illustration and are not to be construed as limitations of the present invention, as many variations of the invention are possible without departing from the spirit and scope of the present disclosure.

Example 1

A yogurt consumable was prepared according to the present disclosure and tasted by a sensory panel. The particular ingredients and the weight percentage of each ingredient included are listed below in Table 2.

The yogurt was prepared as follows: in a first container, 2.35 g of pea protein, 15.55 g of water and 25.00 g of skim milk were weighed and mixed well. Next, the protein binder and off-note blocking compound were added to the mixture. The mixture was then hydrated for 2 hours. In a second container, 25.00 g of skim milk and 18.00 g of cream were weighed, mixed well and heated to 82° C. in order to allow the starches to swell. The starch mixture was then added to the hydrated protein mixture in the first container. The mixture was then homogenized via a two-stage process at total pressure 2500/500 psi. Next, the solution was then pasturized at 85° C. for 5 minutes, cooled to 42° C. and incubated overnight at that temperature. The sample was then refrigerated.

TABLE 2

| Ingredient | Wt % of Final Product |
|---|---|
| Pea protein (1) | 2.35 |
| Skim milk | 50.00 |
| Cream | 18.00 |
| Sugar | 10.00 |
| Stabilizer (2) | 2.75 |
| Culture | 1.00 |
| Protein binder | 0.10 |
| Off-note blocking compound | 0.25 |
| Water | 15.55 |
| Total: | 100% |

(1) NUTRALYS S85F by Roquette
(2) Supplied by TIC Gums

Example 2

A protein beverage composition was prepared according to the present disclosure and tasted by a sensory panel. The particular ingredients and the weight percentage of each ingredient included are listed below in Table 3.

The protein beverage was prepared as follows: in a first container, 35.00 g of pea protein, was weighed and hydrated (400 g of water) at 50° C. using moderate agitation. Next, the protein binder and off-note blocking compound were added to the mixture. In a second container, 0.2 g of carrageenan and 2.5 g of cellulose were mixed and hydrated (200 g of water) at 50° C. to 60° C. for 20 minutes. The salts were dry blended and added to the second container and mixed. The contents of the first container and the second container were combined and the remaining water was added (400 g). pH should be 7.2 to 7.5. The pH may be adjusted using a $KM_2$ salt. The hydrated protein beverage was placed in a refrigerator overnight to maximize hydration. The mixture was then homogenized via a two-stage process at total pressure 2500/500 psi. Next, the blend was then pasturized at 140° C. for 6 seconds. Flavorant was added and the sample was then cooled in a refrigerator for 2 to 3 days.

TABLE 3

| Ingredient | Wt % of Final Product |
|---|---|
| Pea protein (1) | 3.34 |
| Carageenan (2) | 0.02 |
| Cellulose (3) | 0.24 |
| Dipotassium phosphate | 0.38 |
| Tricalcium phosphate | 0.45 |
| Protein binder | 0.01 |
| Off-note blocking compound | 0.01 |
| Flavorant | 0.25 |
| Water | 95.30 |
| Total: | 100% |

(1) NUTRALYS S85F by Roquette
(2) VISCARIN GP209F by FMC BioPolymner
(3) AVICEL GP7210 by FMC BioPolymer The beverage composition according to the formulation of Table 3 was taste tested by a sensory panel comprising ten testers. Panelists were asked to describe the differences in off-notes and bitter notes between the following samples:

| Sample | Taste Results |
|---|---|
| beverage without protein binder/off-note blocking compound/flavorant | Off-taste; beany; bitter; astringent |
| beverage with protein binder/off-note blocking compound but no flavorant | Cleaner; increased mouthfeel; reduced astringency, beany, cardboard, cereal notes |
| beverage with flavorant but no protein binder/off-note blocking compound | Beany base coming through; less flavor, less sweet |
| beverage with protein binder/off-note blocking compound and flavorant | Sweet, less off-notes; better overall flavor; increased mouthfeel; reduced astringency, cardboard, beany and cereal notes |

The samples containing the protein binder and off-note blocking compound are found to have less off-notes and to be less beany, less bitter and less astringent compared to samples without the protein binder and off-note blocking compound.

Test Methods

The test methods and apparatus described below may be useful in testing embodiments of the present disclosure:

Test

The Flavor Release Factor is determined as follows:

Equipment

Gas chromatography-mass spectrometry (GC/MS)

Agilent Technologies 6890N GC. Equipped with Agilent J&W HP-5 column: 0.32 mm I.D.×60 m×1 μm film thickness (Agilent Technologies, Cat. No. 19091J-216)

Agilent Technologies 5973 inert Mass Selective Detector (MSD)

The GC equipped with Gerstel auto sampler: Multipurpose sampler (MPS2) for SPME sampling Analytical Balance: Mettler Toledo AG245 with weighting range (max 210 g/0.1 mg)

SPME sampling vial: Gerstel 20 mL Crimp Cap vial for MPS2 (Fisher Scientific; Cat #: NC9201500)

Cap: Gerstel Magnetic Crimp Caps (Fisher Scientific; Cat #: NC9278732)

Pipets: Eppendorf Reference (3785162) with Max 1 mL of transfer volume

SPME fiber: 50/30 um DVB/CAR/PDMS (Supelco, Cat #: 57328-U)

Definitions

Total Flavor Release Factor =

$$\frac{\frac{\Sigma(\text{peak area for each key flavor ingredient}/\text{threshold for each key flavor ingredient})}{(\text{Protein with binder}/\text{masking compound}/\text{flavor})}}{\frac{\Sigma(\text{peak area for key each flavor ingredient}/\text{threshold for each key flavor ingredient})}{(\text{Protein with flavor and without binder}/\text{masking compound})}} \times 100$$

SPME Sampling and GC/MS Analysis

Dose 0.5% of flavor into protein/or control base.

Equilibrate the sample for 2 days in refrigerator (4° C.)

Weigh 5 g of sample into 20 mL of SPME sampling vial (NC9201500, and crimp cap the vial and load to the Gerstel sample tray Head space sampling with DVB/CAR/PDMS fiber via Gerstel Multipurpose sampler (MPS2)

Sample was pre-heated in incubator for 10 min @ 40° C.

SPME extraction for 60 min @ 40° C.
Analyze sample on GC/MS with temperature ramp: 40° C. (5 min) then ramped @ 4° C./min to 300° C. (10 min).

Instrument Conditions
  Gas Chromatographic Conditions:
  GC inlet temperature: 250° C.
  EPC set to the constant flow mode
  Flow Rate: 2.6 mL/min
  Initial oven temperature: 40° C., held for 5 min
  Temperature ramp: 4° C./min
  Final temperature: 300° C., held for 30 min
  Total run time: 100 min
  Flame Ionization Detector (FID):
  Temperature: 280° C.
  Hydrogen flow: 40.0 mL/min
  Air flow: 400.0 mL/min
  Mode: Constant makeup flow
  Makeup flow: 35.0 mL/min
  Makeup Gas Type: Nitrogen
  Mass Spectrometric Conditions:
  Interface temperature: 280° C.
  Ion source temperature: 230° C.
  Quadruple temperature: 150° C.
  Mass range: 15-300 amu Calculation/Reporting
  The data files were processed by Enhanced ChemStation MSD E.02.01.1177 software (Agilent Technologies, Inc.) and peak areas of flavors are obtained from Total Ion Chromatogram (TIC).
  Automated Mass Spectral Deconvolution and Identification System (AMDIS V2.71) was used for the peak identification with internal library (Vanilla for flavor release.MSL).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments have been illustrated and described, it would be obvious to those skilled in the art that various other changes and modifications can be made without departing from the spirit and scope of the invention. It is therefore intended to cover in the appended claims all such changes and modifications that are within the scope of this invention. It should be understood that the embodiments described above are not only in the alternative, but can be combined.

What is claimed is:

1. A flavor system comprising:
  a protein binder including a mixture of at least one terpene and at least one carbonyl compound; and
  one or more off-note blocking compounds;
  wherein the flavor system provides improved flavor release in non-animal derived protein containing consumables when the weight ratio of off-note blocking compound to protein binder compound in the flavor system is between about 1:1 and about 10:1.

2. The flavor system according to claim 1, wherein the at least one terpene is selected from the group consisting of carotenes; monoterpenes; sesquiterpenes; saponins; lipids; triterpenoids; alpha-pinenes; cis-beta-ocimenes and bisabolenes.

3. The flavor system according to claim 1, wherein the at least one terpene is selected from the group consisting of alpha-carotene; beta-carotene; gamma-carotene; delta-carotene; lycopene; neurosporene; phytofluene; phytoene; canthaxanthin; cryptoxanthin; aeaxanthin; astaxanthin; lutein; rubixanthin; limonene; perillyl alcohol; caryophyllene; β-caryophyllene; zingiberene; phytosterols; campesterol; beta sitosterol; gamma sitosterol; stigmasterol; tocopherol; omega-3, -6, and -9 fatty acids; oleanolic acid; ursolic acid; betulinic acid; moronic acid; alpha-bisabolene and gamma-bisabolene.

4. The flavor system according to claim 1, wherein the at least one carbonyl compound is selected from the group consisting of acetone; acetyl methyl carbinol; acetophenone; 2-butanone; L-carvone; D-carvone; diacetyl; 2-heptanone; beta-ionone; L-menthone; anisyl acetone; methyl cyclopentenolone; methyl nonyl ketone; methyl heptenone; 2-nonanone; 2-octanone; 2-pentanone; 2-undecanonen; 4-hydroxy-2,5dimethyl-3(2H)-furanone; nootkatone; tridecanone; tetradecalactone; decalactone; butyrolactone; 2-tridecanone; benzaldehyde; n-butyraldehyde; isobutraldehyde; cinnamic aldehyde; citronellal; decanal; docecenal; hexanal; aldehyde C-12; aldehyde C-8; acetaldehyde; trans-2-hexenal; anisyl aldehyde; trans 2-decenal; cis-3-hexenal and cis-4-heptenal.

5. The flavor system according to claim 1, wherein the off-note blocking compound is selected from the group consisting of fatty acids; esters; sulfur; sweet browns; sweeteners; and lactones, wherein the sweet browns comprise maltol, vanillin, cyclopentenolone, furaneol, vanilla extracts, caramel extracts, or combinations thereof.

6. The flavor system according to claim 1, wherein the off-note blocking compound is selected from the group consisting of nonanoic acid; decanoic acid; dodecanoic acid; tetradecanoic acid; hexadecanoic acid; oleic acid; octanoic acid; 9-decenoic acid; hexanoic acid; dimethyl sulfide; dimethyl trisulfide; maltol; vanillin; cyclopentenolone; furaneol; vanilla extracts; caramel extracts; ethyl caprate; ethyl dodecanoate; ethyl myristate; ethyl palmitate; ethyl oleate; steviol glycosides; rebaudiosides; rebusodide; swingle extract; mogroside V; erythritol; glucosylated steviol glycosides; sugar distillates; honey distillates; gamma decalactone; delta decalactone; delta dodecalactone; gamma undecalactone; and massoia lactone.

7. The flavor system according to claim 1, wherein the weight ratio of off-note blocking compound to protein binder compound is between about 1:1 and about 5:1.

8. The flavor system according to claim 1, further comprising at least five off-note blocking compounds.

9. The flavor system according to claim 1, wherein the one or more off-note blocking compounds are present in an amount from about 0.00000001 to about 0.0025% based on the total weight percent of the flavor system.

* * * * *